Figure 1:
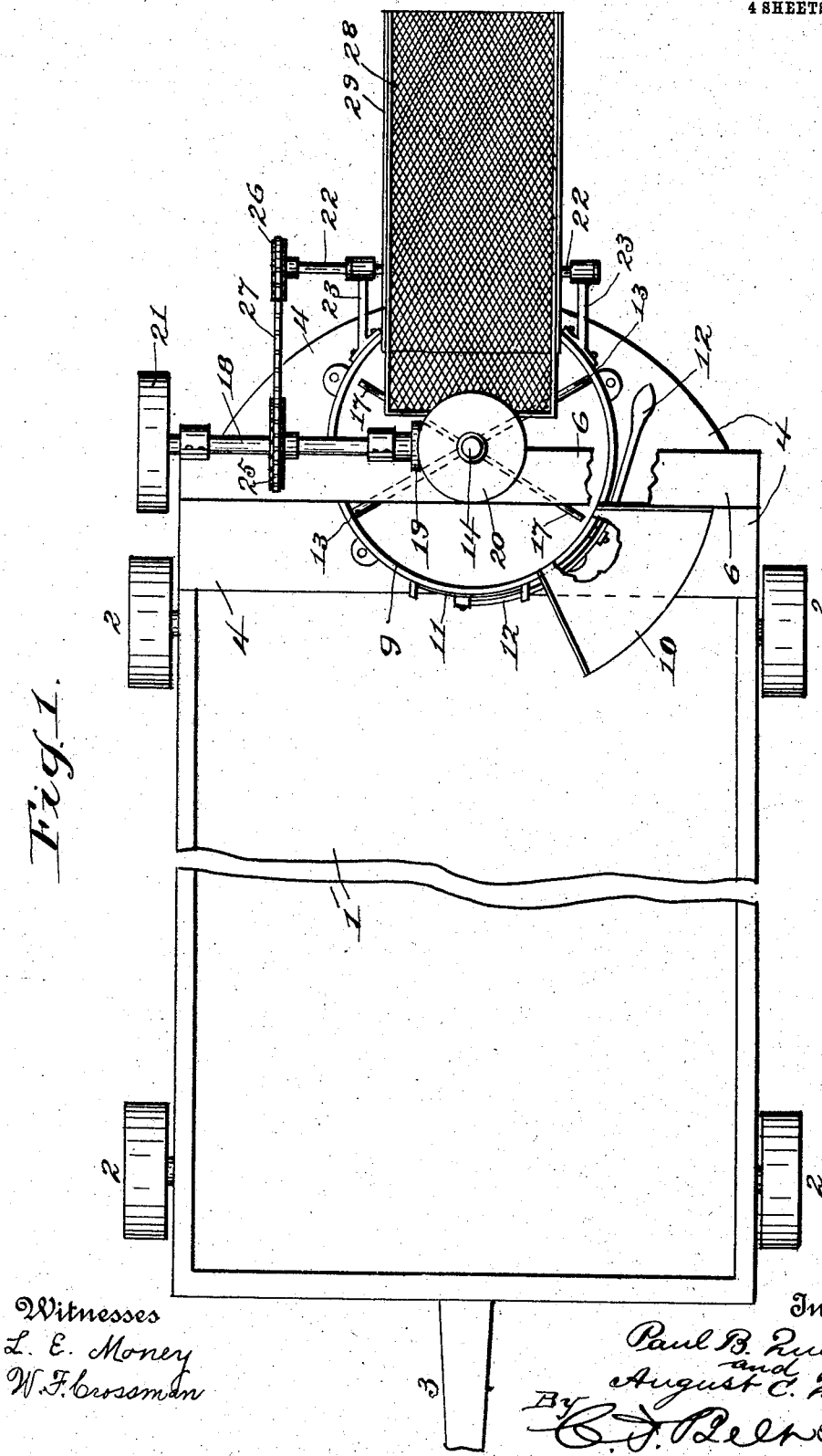

No. 781,457. PATENTED JAN. 31, 1905.
P. B. & A. C. QUADE.
AUTOMATIC SAND SIFTER AND MORTAR MIXER.
APPLICATION FILED JULY 7, 1904.

4 SHEETS—SHEET 1.

Witnesses
L. E. Money
W. F. Crossman

Inventors
Paul B. Quade
and
August C. Quade
By C. J. Pelt Attorney

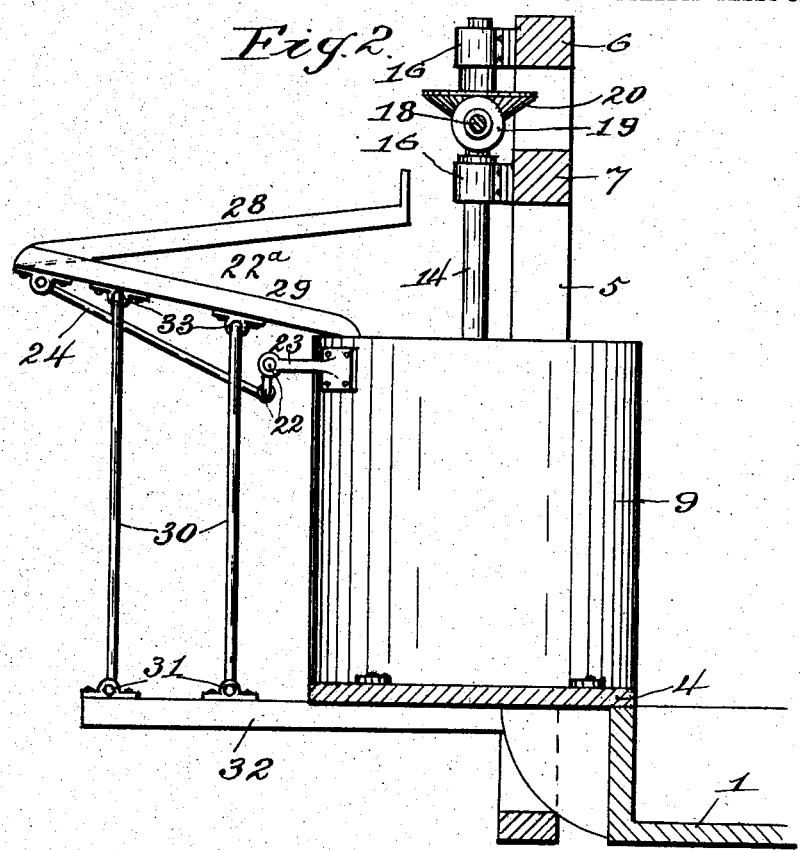

No. 781,457. PATENTED JAN. 31, 1905.
P. B. & A. C. QUADE.
AUTOMATIC SAND SIFTER AND MORTAR MIXER.
APPLICATION FILED JULY 7, 1904.
4 SHEETS—SHEET 3.
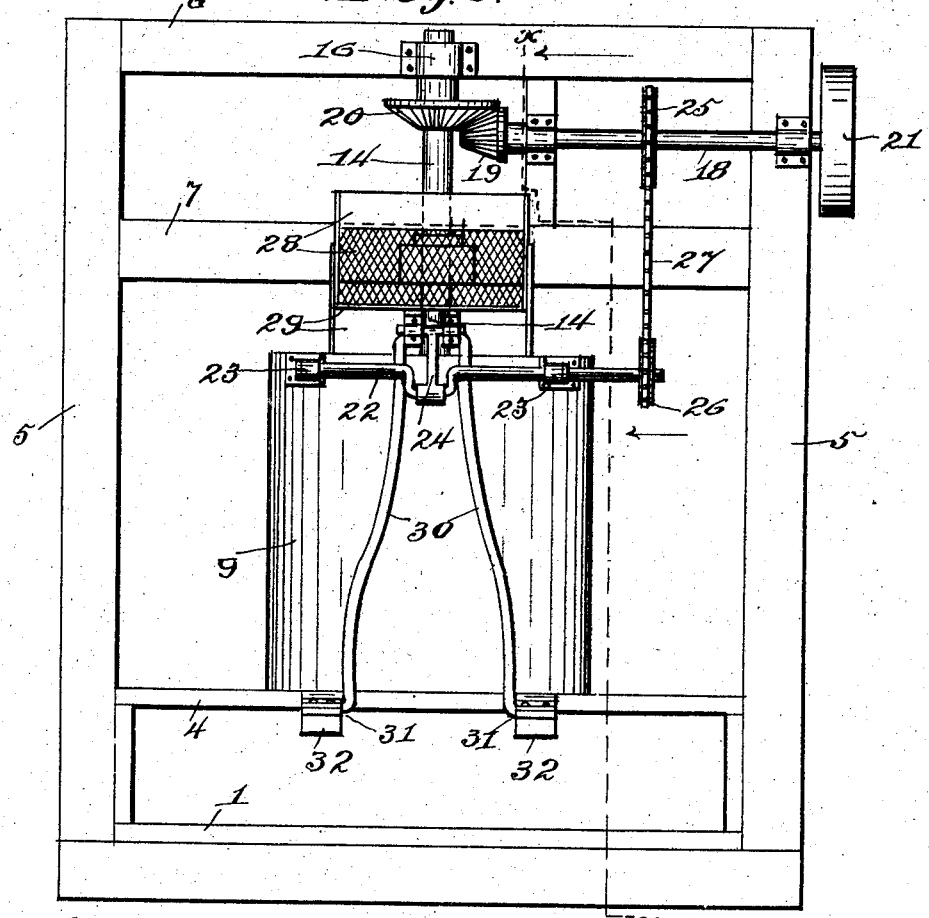
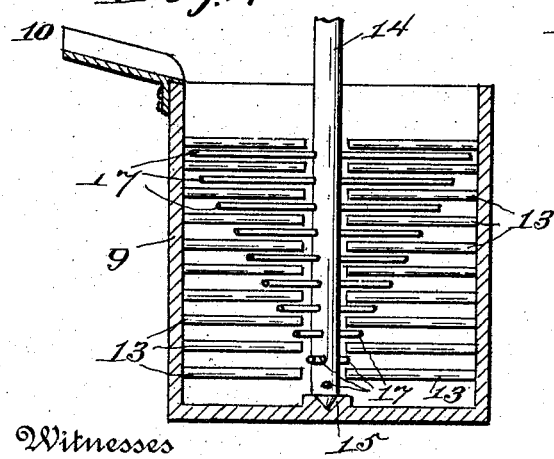
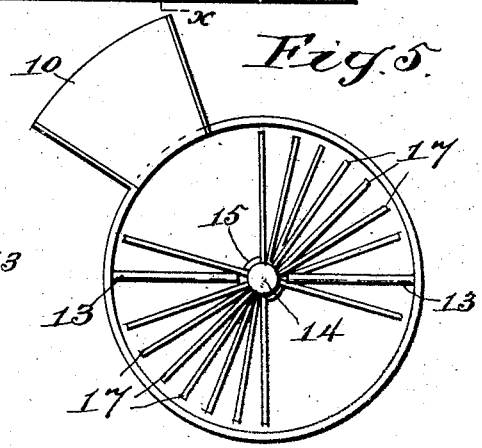
Witnesses
L. E. Money
W. F. Crossman
Inventors
Paul B. Quade
and
August C. Quade
By C. J. Belt, Attorney No. 781,457. PATENTED JAN. 31, 1905.
P. B. & A. C. QUADE.
AUTOMATIC SAND SIFTER AND MORTAR MIXER.
APPLICATION FILED JULY 7, 1904.
4 SHEETS—SHEET 4.
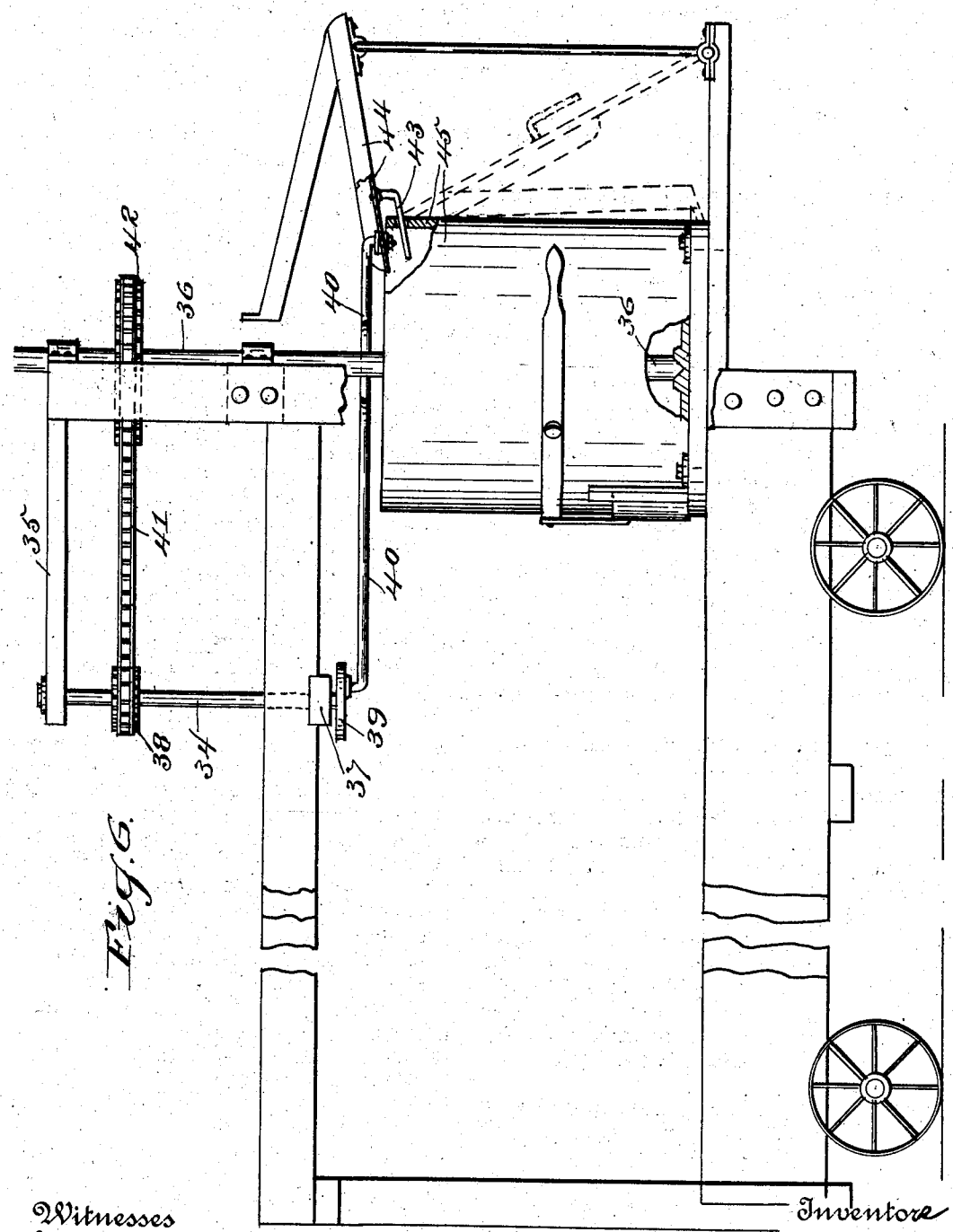
Witnesses
L. E. Money
W. F. Crossman
Inventors
Paul B. Quade
and
August C. Quade
By C. J. Belt Attorney No. 781,457. Patented January 31, 1905.

UNITED STATES PATENT OFFICE.

PAUL B. QUADE AND AUGUST C. QUADE, OF ATHENS, WISCONSIN, ASSIGNORS OF ONE-HALF TO FRANK F. CHESAK AND HERMAN B. ESSELMAN, OF ATHENS, WISCONSIN.

AUTOMATIC SAND-SIFTER AND MORTAR-MIXER.

SPECIFICATION forming part of Letters Patent No. 781,457, dated January 31, 1905.

Application filed July 7, 1904. Serial No. 215,611.

*To all whom it may concern:*

Be it known that we, PAUL B. QUADE and AUGUST C. QUADE, citizens of the United States, residing at Athens, in the county of Marathon and State of Wisconsin, have invented certain new and useful Improvements in Automatic Sand-Sifters and Mortar-Mixers, of which the following is a specification.

This invention relates to mortar-mixing, and pertains especially to a machine for automatically sifting sand into and mixing it with other mortar-making elements.

The object of the invention is to provide a combined sand-sifter and mortar-mixer of such novel and peculiar construction and arrangement of parts that the rotary motion of the mortar-mixing shaft will impart to the sifter a vibratory motion perpendicular to the said shaft.

A further object of the invention is to provide a mortar-mixer with a vibrating screen positioned partially over the mixing vessel and having a sifted-sand chute discharging into the vessel under the screen and to provide a peculiar arrangement of arms upon the mixing-shaft.

A still further object of the invention is to provide a mortar-mixer with a sifter positioned partly over the mortar vessel and having a chute extending thereunder from the discharge end of the sifter and to provide the said chute with a pitman to impart a vibratory motion to the sifter at right angles to the vessel.

Other objects, advantages, and improved results are attainable under the invention, as will be disclosed in the specification to follow.

In the accompanying drawings, forming part of this application, Figure 1 is a top plan view. Fig. 2 is a section on the line $x$ $x$, Fig. 3. Fig. 3 is a rear end view. Fig. 4 is a detail sectional view of the mortar vessel, showing the mixing-shaft in elevation. Fig. 5 is a top view of the mixing vessel and its shaft. Fig. 6 is a side elevation of a modification.

The same numeral references denote the same parts throughout the several views of the drawings.

The machine is preferably portable and carries its own driving power, such as an electric or gasolene engine, and the bed 1 of the machine has wheels 2 and a suitable tongue 3 for drawing it, and it is used as a distributing repository for mixed mortar. One end of the bed is provided with a platform 4 and vertical standards 5, having cross-braces 6 and 7.

The cylindrical mixing vessel 9 is secured upon the platform 4, and it has a receiving-chute 10 and a discharge-door 11, operated by a hand-lever 12, and upon its interior are two sets of parallel bars 13, one set projecting toward the other inwardly from the sides of the vessel and terminating near the center thereof, with an interval between the ends of the bars of each set and a space between the bars of each set. A vertical shaft 14 is stepped in a seat 15 at the bottom of the cylinder and rotates in bearings 16 on the braces 6 and 7. The said shaft 14, which extends between the ends of the opposing sets of bars 13, is provided with two sets of spirally-arranged radial arms 17, revolved in the space between the bars. The shaft 14 is preferably driven by a horizontal shaft 18, having a pinion 19 meshing with a gear 20 on the shaft 14 and provided with a pulley 21, having a suitable belt connection to an engine adapted to be carried on the front end of the bed 1.

A crank-shaft 22 is journaled in arms 23 on the vessel 9 and has a pitman 24, connected to the sand-sifter 22ª, and sprocket-wheels 25 and 26 on the shafts 18 and 22, respectively, and a sprocket-chain 27 imparts motion to the latter shaft.

The sand-sifter has a screen 28, to the outer end of which is secured one end of a chute 29, which inclines under the screen and terminates short of the inner end of the screen, so as to allow this screen end to sift direct into the mixing vessel, while the remainder of the screen sifts onto the chute, which discharges into the vessel. The sifter is supported by means of two pairs of legs 30, pivoted at 31 on projections 32 of the platform and to the sifter-chute at 33.

Referring to the modification shown in Fig.

6 of the drawings, a pitman-shaft 34 is hung from and journaled in a hanger 35, projecting laterally from the top of the machine, and the shaft 36 has a lower journal-bearing 37 and is provided with a sprocket-wheel 38 and an eccentric disk 39, to which is pivotally and eccentrically connected one end of a pitman 40. A sprocket-chain 41 from a sprocket-wheel 42 on the shaft 36 to the sprocket 38 drives the shaft 34. Guides 43 on the under side of the chute 44 slide through the side of the vessel 45 or in bearings on the top edge of the vessel, so as to permit a vibratory movement of the sifter at right angles to the shafts 34 and 36 and to prevent lateral movement of the sifter. To the inner end of the sifter-chute is pivotally coupled the other end of the pitman 40.

It will be seen that this sifter may be withdrawn from the vessel by simply uncoupling the pitman from the chute and allowing the sifter to drop down and be folded up against the vessel, as shown in the drawings. This will put the sifter out of action and permit the mixer to be operated independently. With the sifter in such folded position the machine is in more compact form for transportation, and the screen is protected from accidental injury.

It will be observed that the handle of the door on the mixing vessel follows the curvature of the vessel, so that the handle may not interfere with the removal of mortar from the bed or the treatment thereof on the bed.

It is obvious that the mixer cannot be revolved without revolving the pitman-shaft, which imparts a vibratory motion to the sifter, so that a continuous supply of sand is furnished during the operation of the mixer, and that the vibratory motion of the sifter will vary according to the speed of the mixing-shaft.

Having thus described our invention, what we claim as new, and desire to secure by Letters Patent, is—

1. The combination, with a mortar-mixer having a projecting platform, projections extending from the platform, a cylindrical mixing vessel secured upon the said platform, a vertical mixing-shaft having a gear, and a horizontal shaft having a pinion meshing with the said gear and provided with a sprocket-wheel, of a sifter overhanging the vessel, legs pivoted to the bottom of the sifter and journaled on the said projections, a crank-shaft journaled on the said vessel, a pitman connecting the sifter with the crank-shaft, and the sprocket-chain for driving the crank-shaft.

2. In a mortar-mixer, the combination with a portable bed having a rear platform extension, projections extending from the platform, a vertically-disposed mixing vessel secured upon the platform and adapted to discharge onto the said bed, a vertical mixing-shaft in the vessel and provided with a gear, a horizontal shaft having a pinion meshing with the said gear and provided with a driving-pulley, and a sprocket-wheel on the horizontal shaft, of a sifter overhanging the vessel, legs pivoted to the bottom of the sifter and diverging downwardly and having their bearings on the said projections, a crank-shaft journaled on the vessel, and a pitman working between the legs and connecting the sifter with the crank-shaft.

3. In a portable mortar-mixer, the combination with the bed having wheels, a platform overhanging the bed and projecting from the rear of the bed, projections extending from the platform and provided with bearings, a vertically-disposed mixing vessel secured to the platform and discharging onto the said bed, a vertical mixing-shaft working in the vessel and having a gear, a horizontal shaft having a pinion meshing with the gear at right angles to the mixing-shaft and provided with a driving-pulley, and a sprocket-wheel on the horizontal shaft, of a sifter overhanging the vessel, legs pivoted centrally to the bottom of the sifter and terminating in said bearings, a crank-shaft journaled on the vessel, and having a sprocket-wheel, and a chain for driving the crank-shaft.

In witness whereof we hereunto set our hands in the presence of two witnesses.

PAUL B. QUADE.
    AUGUST C. QUADE.

Witnesses:
 FRED F. DAMON,
 GEO. S. JOHNSTON.